US007515561B2

(12) United States Patent
Koodli et al.

(10) Patent No.: US 7,515,561 B2
(45) Date of Patent: Apr. 7, 2009

(54) SYSTEM AND METHOD FOR DISCOVERING NETWORK INTERFACE CAPABILITIES

(75) Inventors: Rajeev Koodli, Sunnyvale, CA (US); Charles E. Perkins, Saratoga, CA (US)

(73) Assignee: Nokia Corporation, Espoo (FI)

( * ) Notice: Subject to any disclaimer, the term of this patent is extended or adjusted under 35 U.S.C. 154(b) by 140 days.

(21) Appl. No.: 10/293,952

(22) Filed: Nov. 12, 2002

(65) Prior Publication Data

US 2004/0092264 A1 May 13, 2004

(51) Int. Cl.
*H04Q 7/20* (2006.01)
*H04Q 7/38* (2006.01)

(52) U.S. Cl. ....................... 370/331; 370/338; 370/351; 455/437

(58) Field of Classification Search ................. 370/338, 370/331, 352, 401, 329, 235, 351; 455/422.1, 455/436, 439, 456, 437; 709/225, 239
See application file for complete search history.

(56) References Cited

U.S. PATENT DOCUMENTS 6,137,791 A * 10/2000 Frid et al. .................. 370/352
6,256,300 B1 * 7/2001 Ahmed et al. ............... 370/331
6,414,950 B1 7/2002 Rai et al.
6,434,134 B1 * 8/2002 La Porta et al. ............. 370/338
6,487,406 B1 * 11/2002 Chang et al. ............. 455/422.1
6,496,505 B2 * 12/2002 La Porta et al. ............. 370/392
6,535,493 B1 * 3/2003 Lee et al. ..................... 370/329
6,614,774 B1 * 9/2003 Wang ......................... 370/338
6,654,359 B1 * 11/2003 La Porta et al. ............. 370/328
6,707,803 B1 * 3/2004 Suk ........................... 370/331
6,763,007 B1 * 7/2004 La Porta et al. ............. 370/331
6,798,773 B2 * 9/2004 Trossen et al. .............. 370/390
6,804,221 B1 * 10/2004 Magret et al. ............... 370/338
6,832,087 B2 * 12/2004 Gwon et al. ................ 455/436
6,839,323 B1 * 1/2005 Foti ........................... 370/235
6,954,790 B2 * 10/2005 Forslow ...................... 709/227
6,970,445 B2 * 11/2005 O'Neill et al. .............. 370/338
7,050,793 B1 * 5/2006 Kenward et al. ......... 455/414.4
7,068,624 B1 * 6/2006 Dantu et al. ................ 370/331
7,075,908 B2 * 7/2006 Noguchi et al. ............. 370/329
7,170,869 B2 * 1/2007 Yang et al. .................. 370/328
7,187,931 B2 * 3/2007 Trossen ...................... 455/440
7,197,019 B2 * 3/2007 Menzel et al. ............. 370/331
7,224,677 B2 * 5/2007 Krishnamurthi et al. .... 370/331
7,272,122 B2 * 9/2007 Trossen et al. ............. 370/331
2002/0049059 A1 * 4/2002 Soininen et al. ............. 455/439
2003/0002468 A1 * 1/2003 Khalil et al. ................ 370/338
2003/0087646 A1 * 5/2003 Funato et al. ............... 455/456
2003/0158938 A1 * 8/2003 Adatrao et al. ............. 709/225

(Continued)

OTHER PUBLICATIONS

Charles E. Perkins, Mobile IP, IEEE Communications Magazine May 1997, pp. 84-99.*

*Primary Examiner*—Alpus H Hsu
(74) *Attorney, Agent, or Firm*—Squire, Sanders & Dempsey, LLP

(57) ABSTRACT

A system and method for discovering capabilities of a network interface prior to a handover. The mobile node detects a beacon with a radio interface identifier that identifies a new access router (NR). Using the radio interface identifier, the mobile node obtains interface information on the NR through a current access router (CR). The interface information identifies the capabilities of the NR.

39 Claims, 3 Drawing Sheets

U.S. PATENT DOCUMENTS

2003/0193912 A1* 10/2003 O'Neill ...................... 370/331
2004/0005894 A1* 1/2004 Trossen et al. .............. 455/436
2004/0047322 A1* 3/2004 O'Neill ...................... 370/338
2004/0196808 A1* 10/2004 Chaskar et al. ............. 370/331
2005/0213545 A1* 9/2005 Choyi et al. ................ 370/338

* cited by examiner

SYSTEM AND METHOD FOR DISCOVERING NETWORK INTERFACE CAPABILITIES

BACKGROUND OF THE INVENTION

In a mobile IP network, when a mobile node changes its point of attachment to the network, a handover may occur between the current access router (CR) and a new access router (NR). The association of a mobile node with a CR may be handed over to a NR for a variety of reasons. For example, the mobile node may have physically moved to another location where the CR is no longer able to provide IP connectivity to the mobile node. Therefore, the mobile node re-associates with an NR for IP connectivity. Similarly, changes in network traffic demands may cause the CR associated with a mobile node to become overloaded. In this case, the association of the mobile node can be changed to a NR that is less loaded.

Mobile IP is described in more detail in IETF specifications. The basic idea of the mobile IP is that the mobile node can be always identified by its home address, regardless of its current point of attachment to the Internet. When the mobile Node is away from the home network it is also associated with a care-of address, which provides information about the mobile node's current location. Typically during handovers between the access routers the care-of address changes but the home address stays the same.

In any case, an IP level handover between points of attachment causes a mobile node to reconnect to the IP network through a NR instead of a CR. Such a handover may occur between access routers disposed within the same administrative (or routing) domain or across administrative domains. Prior to initiating an actual handover process, a mobile node needs to know the IP address of the NR and to verify that the NR supports features requires by the mobile node, such as quality of service (QoS), header compression, etc.

It is with respect to these considerations and others that the present invention has been made, and will be understood by reading and studying the following specification.

SUMMARY OF THE INVENTION

Briefly stated, this invention is directed to a system and method for discovering capabilities of a network interface prior to a handover. In accordance with the invention, a method is provided for enabling a mobile node in a network to undergo a handover from a current access router (CR) to a new access router (NR). The mobile node detects a beacon associated with the NR. The beacon includes a radio interface identifier that identifies the NR. Using the radio interface identifier, the mobile node obtains interface information on the NR through a current access router (CR) with which the mobile node has an existing connection. The interface information identifies the capabilities of the NR.

In accordance with another aspect of the invention, a system is provided for enabling a mobile node to discover interface information. The system includes a CR and a NR. The NR is one of the access routers in an administrative domain and is configured to provide the interface information to the CR. The CR is configured to provide a wireless network connection to the mobile node. The CR is in communication with the access routers in the administrative domain and is further configured to provide the interface information to the mobile node.

In accordance with yet another aspect of the invention, a method for communicating between a mobile node and a CR in a wireless communication network. The mobile node issues a request message having an interface identifier associated with a NR. The CR receives the request message and uses the interface identifier to obtain capability information on the NR. The CR issues a reply message containing the capability information. The mobile node receives the reply message and uses the capability information to enable a handover from the CR to the NR.

DETAILED DESCRIPTION OF THE PREFERRED EMBODIMENT

Figure 1:
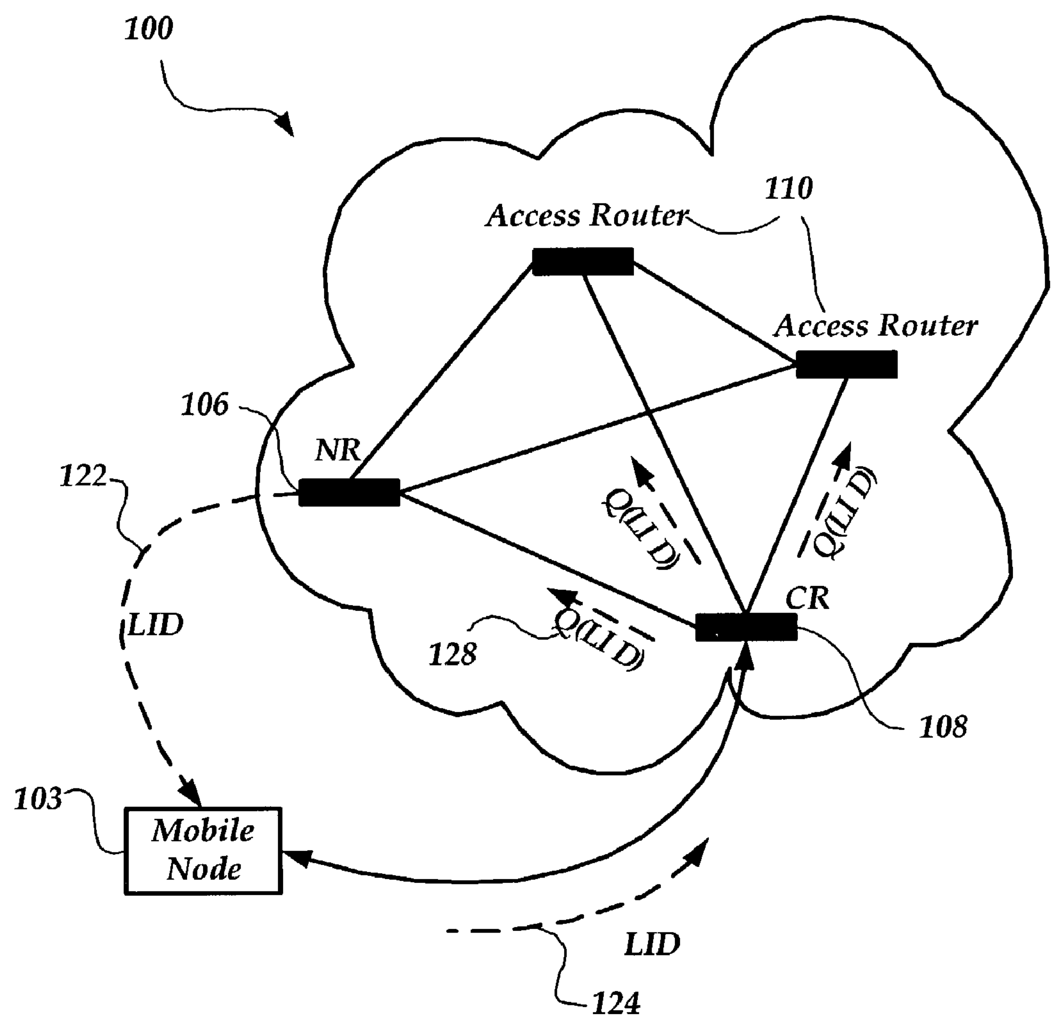
FIG. 1 illustrates a diagram where a mobile node requests interface information from an access router in a wireless network.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "flow" refers to a flow of packets. The term "user" refers to any person or customer such as a business or organization that employs a mobile node to communicate or access resources over a mobile IP network.

The term "router" refers to a dedicated network element that receives packets and forwards them towards the destination. In particular, a router is used to extend or segment networks by forwarding packets from one subnet to another. A router typically operates at layer 3 TCP/IP of the Open Systems Interconnection (OSI) reference model for networking. However, some routers can provide additional functionality that operates above layer 3 of TCP/IP or OSI reference model.

The term "access router" refers to a router that is associated with a mobile node for providing IP connectivity between the mobile node and other nodes on an IP network, such as a correspondent node. Although the access router is a dedicated network element coupled to the IP network, it may also be in communication with one or more points of attachment for a wireless network.

The term "mobile node" refers to a wireless device that may change its point of attachment from one network or sub-network to another. A mobile node may change its location without losing connectivity and without changing its IP address; it may continue to communicate with other Internet nodes at any location using its (constant) IP address, assuming link-layer connectivity to a point of attachment is available.

Referring to the drawings, like numbers indicate like parts throughout the views. Additionally, a reference to the singular includes a reference to the plural unless otherwise stated or is inconsistent with the disclosure herein.

This invention can use any method and system for communicating between a mobile node and a network. The network typically includes network access routers that connect to the mobile node through a radio interface. Under certain circumstances, the mobile node may disconnect from a current access router and connect to new access router. This invention enables the mobile node to obtain interface information about the new access router through the current access router.

FIG. 1 illustrates a diagram where a mobile node requests interface information from an access router in a wireless network. As shown in the figure, mobile node 103 is coupled to wireless network 100 through a radio interface associated with current access router (CR) 108. The association of CR 108 with mobile node 103 may be handed over to a new access router (NR) 106 to maintain IP connectivity to wireless network 100. Information relating to NR 106, such as its associated IP network prefix and radio interface capabilities, are requested by mobile node 103 for performing an efficient handover.

During operation, mobile node 103 may detect beacon 122 from NR 106. Beacon 122 may contain a unique radio interface identifier, such as a base station identification. In one embodiment of the invention, beacon 122 includes a link layer identification (LID) that identifies NR 106.

When mobile node 103 determines that a handover to NR 106 is desired, mobile node 103 may send request message 124 to CR 108 for information about NR 106. Request message 124 includes the radio interface identifier contained in beacon 122. In one embodiment of the invention, request message 124 is a Proxy Router Solicitation message with an additional flag that requests interface capability information.

When CR 108 receives request message 124, CR 108 sends query messages 128 to other access routers in network 100. Query messages 128 solicits information regarding the access router associated with the radio interface identifier. Query messages 128 may solicit the IP network prefix that is associated with the NR 106. Query messages 128 may also solicit information about capabilities of NR 106. In one embodiment of the invention, CR 108 sends query messages 128 to other access routers in the administrative domain to which CR 108 belongs. The access routers in this administrative domain may be organized as a Multicast Group.

Figure 2:
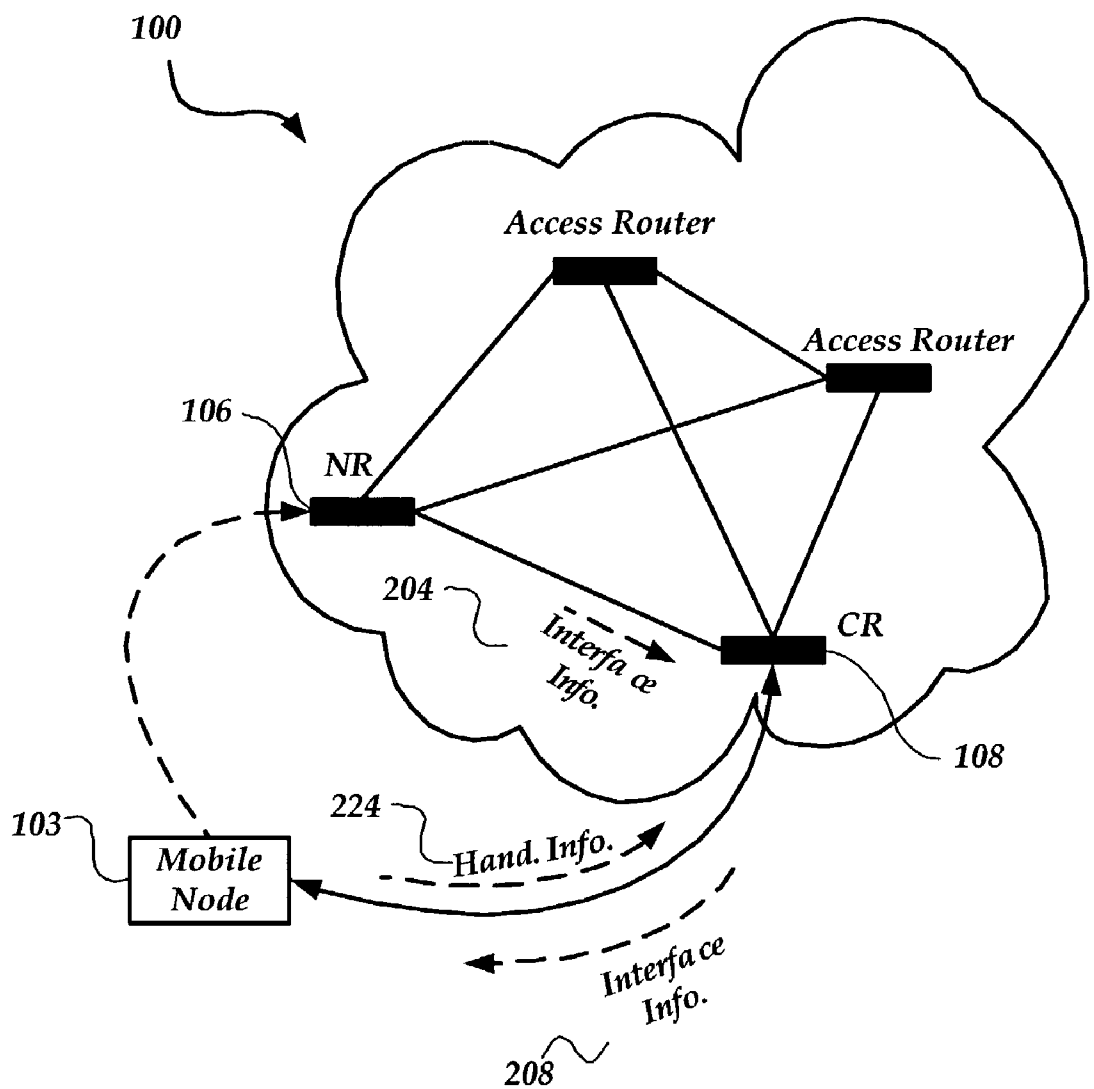
FIG. 2 illustrates a diagram where a current access router provides interface information on a new access router to a mobile node.

FIG. 2 illustrates a diagram where a current access router provides interface information on a new access router to a mobile node. For the purposes of discussion, CR 108 has sent query messages to access routers in network 100 that includes NR 106. NR 106 recognizes the radio interface identifier contained in query messages 128. In response, NR 106 sends to access routers in network 100 response messages 204 that include the IP prefix of NR 106 and information about the capabilities of NR 106 and its radio interface. These capabilities may include Quality of Service, Security, Header Compression, Buffers, Multicast, Instant Messaging, Applications, and the like. In one embodiment of the invention, the capability information in response message 204 is sent as a bit-vector that summarizes the currently available capabilities. Response messages 204 may be sent to access routers in the administrative domain to which NR 106 belongs.

CR 108 receives response message 204 from NR 106. In response to receiving the response messages, CR 108 sends reply message 208 containing the IP prefix and the capability information to mobile node 103. CR 108 may cache the IP prefix and the capability information associated with NR 106 so that it can respond to request messages sent by other mobile nodes that contain the same interface identifier without sending the same query messages again. In one embodiment of the invention, reply message 208 is a Proxy Router Advertisement message with a bit-vector that represents the interface capabilities of NR 106.

Mobile node 103 receives reply message 208 and determines whether to undergo a handover to NR 106. For example, mobile node 103 may make this determination based on whether NR 106 has the desired capabilities. If a determination is made to undergo a handover to NR 106, mobile node 103 constructs a new IP address using the IP network prefix contained in reply message 208. Mobile node 103 may also issue a request for specific capabilities that mobile node 103 would like NR 106 to support. Mobile node 103 sends to CR 108 handover information message 224 that contains the new IP address and, optionally, a request for the transfer of specific capabilities from CR 108 to NR 106. Mobile node 103 may then disassociate itself from CR 108 and attempt to establish connectivity with NR 106.

Figure 3:
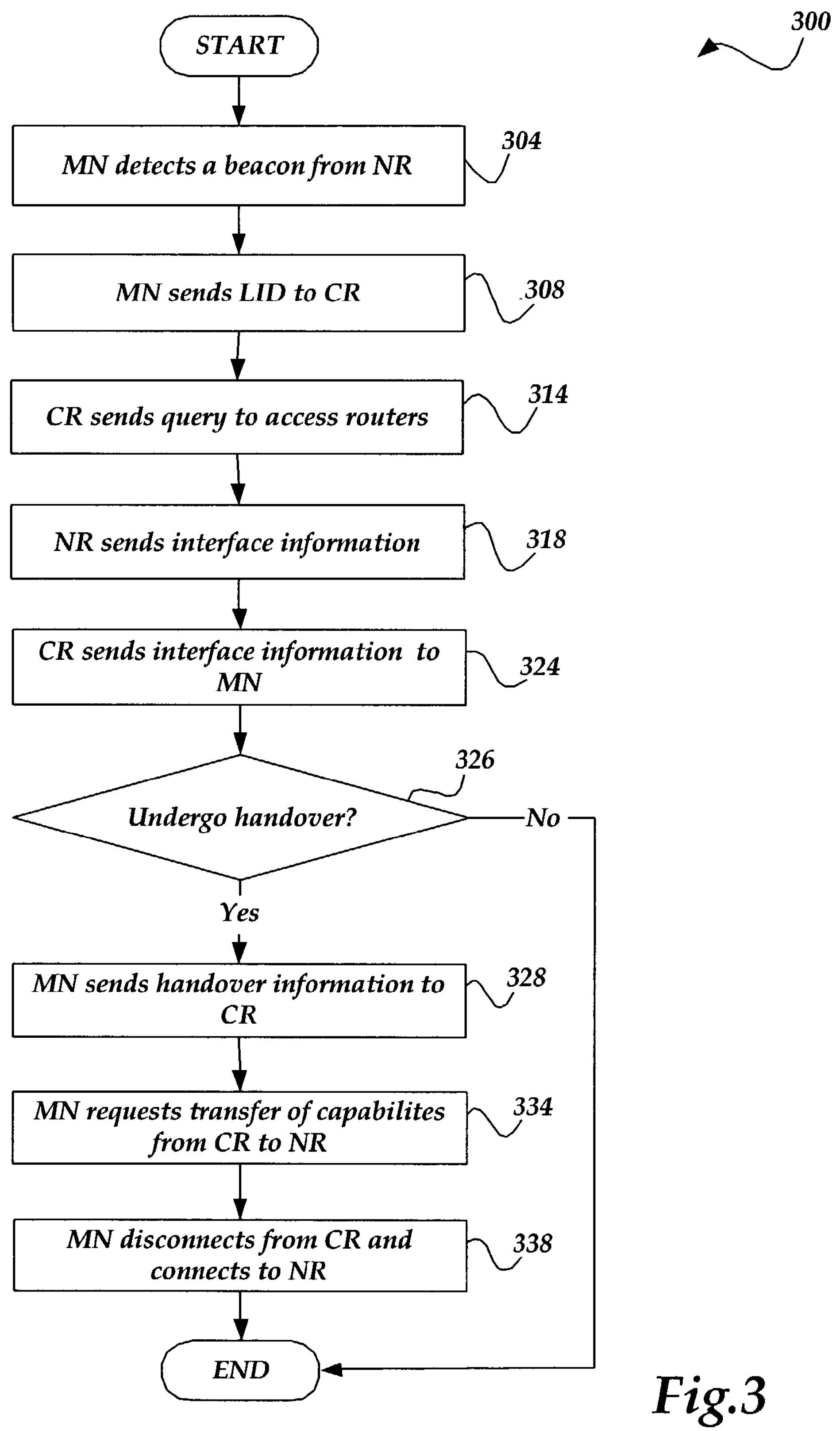
FIG. 3 illustrates a process for a mobile node to discover network interface capabilities of a new access router.

FIG. 3 illustrates a process for a mobile node (MN) to discover network interface capabilities of a new access router (NR). Moving from a start block, process 300 flows to block 304 where the MN detects a radio beacon from the NR. The radio beacon may include a link-layer identification (LID) associated with the NR.

The process moves to block 308 where the MN sends a request to a current access router (CR) for interface information on the NR. The request may contain the LID included in the radio beacon. Process 300 goes to block 314 where the CR receives the request from the MN and sends a query to other access routers in the network. The query solicits interface information on the access router identified by the LID. The NR receives the query and recognizes the LID. The process then flows to block 318 where the NR sends its IP network prefix and information on its capabilities to the CR.

Next, process 300 continues at 324 where the CR sends the interface information on the NR to the MN. The process moves to decision block 326 where a determination is made whether to undergo a handover to the NR. When a determination has been made to undergo a handover, the process goes to block 328. Otherwise, process 300 moves to an end block and returns to processing other actions.

At block 328, the MN sends handover information to the CR. The handover information may include the MN's IP address and, optionally, the capabilities that the MN would like the NR to support. Process 300 continues at block 334 where the MN requests the transfer of capabilities from the CR to the NR. Flowing to block 338, the MN disconnects from the CR and connects to the NR.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

determining at a mobile node an identifier associated with a new access router in an administrative domain;

obtaining interface information on the new access router from a current access router configured to provide a wireless network connection to a mobile node using the identifier, wherein the interface information comprises capability information that describes the capabilities of the new access router; and determining at the mobile node whether to undergo a handover from the current access router to the new access router using the capability information.

2. The method of claim 1, wherein the interface information scomprises at least one of quality of service, header compression, buffers, multicast, instant messaging, or applications security.

3. The method of claim 1, wherein the interface information comprises a bit-vector that represents the capabilities of the new access router.

4. The method of claim 1, wherein the interface information comprisesan internet protocol prefix associated with the new access router.

5. The method of claim 1, wherein determining the identifier further comprises detecting a beacon tha comprising the identifier.

6. The method of claim 1, wherein obtaining the interface information further comprises querying access routers in a network using the identifier.

7. The method of claim 6, wherein the access routers and the current access router belong to the same administrative domain.

8. The method of claim 6, wherein the access routers are organized in a multicast group.

9. The method of claim 6, wherein obtaining the interface information further comprises sending interface information by the new access router to the current access router.

10. The method of claim 1, further comprising undergoing a handover from the current access router to the new access router using the interface information.

11. A system, comprising:

a new access router configured in an administrative domain; and a current access router configured to provide a wireless network connection to a mobile node, wherein the current access router is configured to communicate with access routers in the administrative domain, wherein the new access router is configured to provide interface information to the current access router, wherein the current access router is configured to provide the interface information to the mobile node to assist in a handover from the current access router to the new access router, wherein the interface information comprises capability information that describes the capabilities of the new access router, and wherein the mobile node is configured to determine whether to undergo a handover from the current access router to the new access router using the capability information.

12. A method, comprising: sending a request message from a mobile node to a current access router, the request message comprising an interface identifier associated with a new access router in an administrative domain;

receiving a reply message at the mobile node from the current access router, the reply message comprising capability information on the new access router, and determining at the mobile node whether to undergo a handover from the current access router to the new access router using the capability information.

13. The method of claim 12, wherein the interface identifier is a link layer identification.

14. The method of claim 12, wherein the request message is a proxy router solicitation message that comprises an additional flag for requesting interface capability information.

15. The method of claim 12, further comprising: using the interface identifier to obtain an internet protocol network prefix associated with the new access router.

16. The method of claim 12, wherein the capability information comprises a bit-vector representing the capabilities of the new access router.

17. The method of claim 12, wherein the reply message is a proxy router advertisement message with a bit-vector that represents the capabilities of the new access router.

18. The method according to claim 12, wherein the interface identifier is used to obtain an internet protocol network prefix associated with the new access router and capability information on the new access router;

and wherein the reply message comprises the internet protocol network prefix, the method further comprising sending a handover information message to the current access router, the handover information message comprising an internet protocol address.

19. The method of claim 18, wherein the handover information message further comprises a request for capabilities on the new access router.

20. A method, comprising:

receiving a request message from a mobile node, the request message comprising an interface identifier and using the interface identifier to obtain capability information on a new access router;

sending query messages to access routers in an administrative domain wherein the query messages comprise the interface identifier;

receiving a response message from a new access router, wherein the response message comprises capability information; and transmitting to the mobile node a reply message comprising the capability information, to permit the mobile node to determine whether to undergo a handover from the current access router to the new access router using the capability information.

21. The method of claim 20, wherein the interface identifier is a link layer identification.

22. An apparatus, comprising:

a determiner configured to determine an identifier associated with a new access router; and an interface configured to obtain interface information on the new access router from the current access router using the identifier, wherein the interface information comprises capability information that describes the capabilities of the new access router; and a handover circuit configured to determine whether to undergo a handover from the current access router to the new access router using the capability information.

23. The apparatus of claim 22, wherein the handover circuit is further configured to use the interface information to undergo a handover from the current access router to the new access router.

24. The apparatus of claim 22, wherein the apparatus comprises a receiver configured to receive the interface information.

25. The apparatus of claim 22, wherein the apparatus comprises a processor configured to request a transfer of capabilities from the current access router to the new access router.

26. An apparatus, comprising: a processor configured to:

send a request message from a mobile node to a current access router, the request message comprising an interface identifier associated with a new access router in an administrative domain;

receive a reply message at the mobile node from the current access router, the reply message comprising capability information on the new access router, and determine at the mobile node whether to undergo a handover from the current access router to the new access router using the capability information.

27. The apparatus of claim 26, wherein the interface identifier is a link layer identification.

28. The apparatus of claim 26, wherein the request message is a proxy router solicitation message that comprises an additional flag for requesting interface capability information.

29. The apparatus of claim 26, wherein the processor is further configured to use the interface identifier to obtain an internet protocol network prefix associated with the new access router.

30. The apparatus of claim 26, wherein the capability information comprises a bit-vector representing the capabilities of the new access router.

31. The apparatus of claim 26, wherein the reply message is a proxy router advertisement message with a bit-vector that represents the capabilities of the new access router.

32. An apparatus, comprising: a processor configured to:

receive a request message from a mobile node, the request message comprising an interface identifier and using the interface identifier to obtain capability information on a new access router;

send query messages to access routers in an administrative domain, wherein the query messages comprise the interface identifier;

receive a response message from a new access router, wherein the response message comprises capability information; and transmit to the mobile node a reply message comprising the capability information, to permit the mobile node to determine whether to undergo a handover from the current access router to the new access router using the capability information.

33. The apparatus of claim 32, wherein the interface identifier is a link layer identification.

34. A computer readable storage medium encoded with instructions that, when executed by a computer, perform a process comprising:

determining at a mobile node an identifier associated with a new access router in an administrative domain;

obtaining interface information on the new access router from a current access router configured to provide a wireless network connection to a mobile node using the identifier, wherein the interface information comprises capability information that describes the capabilities of the new access router; and determining at the mobile node whether to undergo a handover from the current access router to the new access router using the capability information.

35. A computer readable storage medium encoded with instructions that, when executed by a computer, perform a process comprising:

sending a request message from a mobile node to a current access router, the request message comprising an interface identifier associated with a new access router in an administrative domain;

receiving a reply message at the mobile node from the current access router, the reply message comprising capability information on the new access router and using the capability information to enable a handover from the current access router to the new access router, and determining at the mobile node whether to undergo a handover from the current access router to the new access router using the capability information.

36. A computer readable storage medium encoded with instructions that, when executed by a computer, perform a process comprising:

receiving a request message from a mobile node, the request message comprising an interface identifier and using the interface identifier to obtain capability information on a new access router;

sending query messages to access routers in an administrative domain, wherein the query messages comprise the interface identifier;

receiving a response message from a new access router, wherein the response message comprises capability information; and transmitting to the mobile node a reply message comprising the capability information, to permit the mobile node to determine whether to undergo a handover from the current access router to the new access router using the capability information.

37. An apparatus, comprising:

first determining means for determining an identifier associated with a new access router; and interface means for obtaining interface information on the new access router from the current access router using the identifier, wherein the interface information comprises capability information that describes the capabilities of the new access router; and second determining means for determining whether to undergo a handover from the current access router to the new access router using the capability information.

38. An apparatus, comprising:

sending means for sending a request message from a mobile node to a current access router, the request message comprising an interface identifier associated with a new access router in an administrative domain;

receiving means for receiving a reply message at the mobile node from the current access router, the reply message comprising capability information on the new access router, and determining means for determining at the mobile node whether to undergo a handover from the current access router to the new access router using the capability information.

39. An apparatus, comprising:

first receiving means for receiving a request message from a mobile node, the request message comprising an interface identifier and using the interface identifier to obtain capability information on a new access router in an administrative domain;

sending means for sending query messages to access routers, wherein the query messages comprise the interface identifier;

second receiving means for receiving a response message from a new access router, wherein the response message comprises capability information; and transmitting means for transmitting to the mobile node a reply message comprising the capability information, to permit the mobile node to determine whether to undergo a handover from the current access router to the new access router using the capability information.

* * * * *